United States Patent [19]

Leivian

[11] Patent Number: 5,222,210
[45] Date of Patent: Jun. 22, 1993

[54] METHOD OF DISPLAYING THE STATE OF AN ARTIFICIAL NEURAL NETWORK

[75] Inventor: Robert H. Leivian, Chandler, Ariz.

[73] Assignee: Motorola, Inc., Schaumburg, Ill.

[21] Appl. No.: 620,944

[22] Filed: Dec. 3, 1990

[51] Int. Cl.$^5$ .............................................. G06F 15/00
[52] U.S. Cl. ........................................ 395/161; 395/12
[58] Field of Search ...................... 395/12, 21, 60, 76, 395/22, 161, 160, 920; 364/489

[56] References Cited

U.S. PATENT DOCUMENTS

| | | | |
|---|---|---|---|
| 4,638,442 | 1/1987 | Bryant et al. | 364/489 |
| 4,752,889 | 6/1988 | Rappaport et al. | 395/12 |
| 4,845,633 | 7/1989 | Furtek | 395/161 |
| 4,947,365 | 8/1990 | Masubuchi | 364/489 |
| 4,970,664 | 11/1990 | Kaiser et al. | 364/488 |
| 5,089,973 | 2/1992 | Furtek | 364/489 |

OTHER PUBLICATIONS

Wickham, K. L., "Neural Network Simulation Package from Ohio State University", U.S. Department of Energy, (Aug. 1990).

Nakajima, T., "Architecture of the Neural Network Simulation Accelerator Neurosim/L", International Neural Network Conference Jul. 9-13, 1990, (Jul. 1990).

Hwang, Keith, "Product Review NeuralWare's NeuralWorks Professional II", IEEE Expert, vol. 4 No. 2 (Summer 1989) p. 88.

Nijhuis, Jos. "Structure and Application of NNSIM: A General Purpose Neural Network Simulator", Microprocessing and Microprogramming Nos. 1/5 (Aug. 27, 1989) pp. 189-194.

"UK Poplog-Neural Will Make Neural Networks Integral to Commerce, Industry", Computergram International n1391 (Mar. 23, 1990).

Mead, Carver, "Analog VLSI Implementation of Neural Systems"(Kluwer Academic Publishers 1989) pp. 137-138.

Sejnowski, T. J. "NETtalk: A Parallel Network that Learns to Read Aloud" The Johns Hopkins University Electrical Engineering and Computer Science Technical Report JHU/EECS-86/01.

*Primary Examiner*—Gary V. Harkcom
*Assistant Examiner*—N. Kenneth Burraston
*Attorney, Agent, or Firm*—Robert D. Atkins

[57] ABSTRACT

A computer simulator is provided for displaying the state of an artificial neural network in a simplified yet meaningful manner on a computer display terminal. The user may enter commands to select one or more areas of interest within the neural network for further information regarding its state of learning and operation. One display mode illustrates the output activity of each neuron as representatively sized and shaded boxes within the border of the neuron, while another display mode shows the connectivity as weighted synapses between a user-selected neuron and the remaining neurons of the network in a similar manner. A third display mode provides a tuning curve wherein the synapses associated with each of the neurons are represented within the borders of the same. Both grid block and line graph type characterization are supported. The methodology allows large neural networks on the order of thousands of neurons to be displayed in a meaningful manner.

2 Claims, 10 Drawing Sheets

METHOD OF DISPLAYING THE STATE OF AN ARTIFICIAL NEURAL NETWORK

FIELD OF THE INVENTION

This invention relates in general to a computer method of displaying the state of an artificial neural network on a graphic display terminal.

BACKGROUND OF THE INVENTION

A computer simulation is a useful step during the design of an electronic circuit to test the various features before a physical embodiment is is built. The circuit may be mathematically modeled in the computer simulator whereby the design parameters may be verified or manipulated to work out the inevitable problems associated with different embodiments before proceeding with the cost and effort of building an actual model. In the case of an artificial neural network, a computer simulation also provides an avenue for graphically displaying the structure of the neural network, that is the synapses, summing junctions, nonlinear sigmoid functions and detailed interconnection thereof, for aiding the circuit designer in understanding the overall operation. The synapses may be shown as circles or ovals connected with lines to the summing junction and sigmoid function.

A neural network may contain hundreds or even thousands of interconnected neurons for providing a single useful function. For such neural networks, conventional display techniques often prohibit the user from displaying the composite network on a single display screen in a meaningful manner in that the large number of synapses, summing junctions and nonlinear sigmoid functions and the maze of connecting lines either cannot physically be contained on the display screen in a readable form, or becomes too confusing for the designer to follow. There are just too many circles and lines leading in many directions to provide a meaningful summary and understanding of its operation. Thus, computer simulators typically restrict the field of display to only a small portion of the neural network for providing at least some useful information. Unfortunately, it is often difficult to grasp the full flavor and operation of the neural network by viewing only a small portion thereof. It would be desirable to simplify the representation of the neural network and avoid the overwhelming detail of the components normally associated therewith.

Hence, there is need for an improved method of graphically displaying large portions if not an entire representation of an artificial neural network in a simplified yet meaningful manner on a computer display terminal without the unnecessary and cumbersome detail of conventional neural network symbolism.

SUMMARY OF THE INVENTION

Briefly stated, the invention comprises a method of displaying a state of a neuron network on a graphic display terminal with a plurality of neuron blocks comprising the steps of positioning a cursor on the graphic display terminal with a user interface device, receiving a command from the user interface device for determining XY-coordinates of the cursor on the graphic display terminal where the XY-coordinates of the cursor identifies a first one of the plurality of neuron blocks, processing through second ones of the plurality of neuron blocks to identify a synaptic weight connection between the first one of the plurality of neuron blocks and a second one of the plurality of neuron blocks, and displaying a box within the second one of the plurality of neuron blocks upon finding the synaptic weight connection between the first one of the plurality of neuron blocks and the second one of the plurality of neuron blocks where the box has an area representative of the synaptic weight connection.

One of the advantages of the present invention is the method of displaying the state of an artificial neural network in a simplified yet meaningful manner on a computer display terminal, wherein the user may enter commands to select one or more areas of interest within the neural network for further information regarding its state of learning and operation. One display mode illustrates the output activity of each neuron as representatively sized and shaded boxes (grid), or as a strip chart recording (graph) within the border of the neuron, while another display mode shows the connectivity as weighted synapses between a user-selected neuron and the remaining neurons of the network in a similar manner. Likewise, it is possible to view the weight and polarity of the synapses of each neuron although without the connectivity information, but with the relationship to the neighboring neuron preserved. Both grid block and line graph type characterizations are supported.

Another advantage of this method is that since the same screen area is reused for all display modes and space is only allocated for neurons (not synapses), meaningful displays can be made for thousands of neurons and tens of thousands of synapses. This is in contrast with prior art techniques in which separate areas of the screen are used for synapses and neurons and since there are potentially more synapses than neurons, the screen becomes excessively cluttered or must be overlaid.

DETAILED DESCRIPTION OF THE PREFERRED EMBODIMENT

Figure 1:
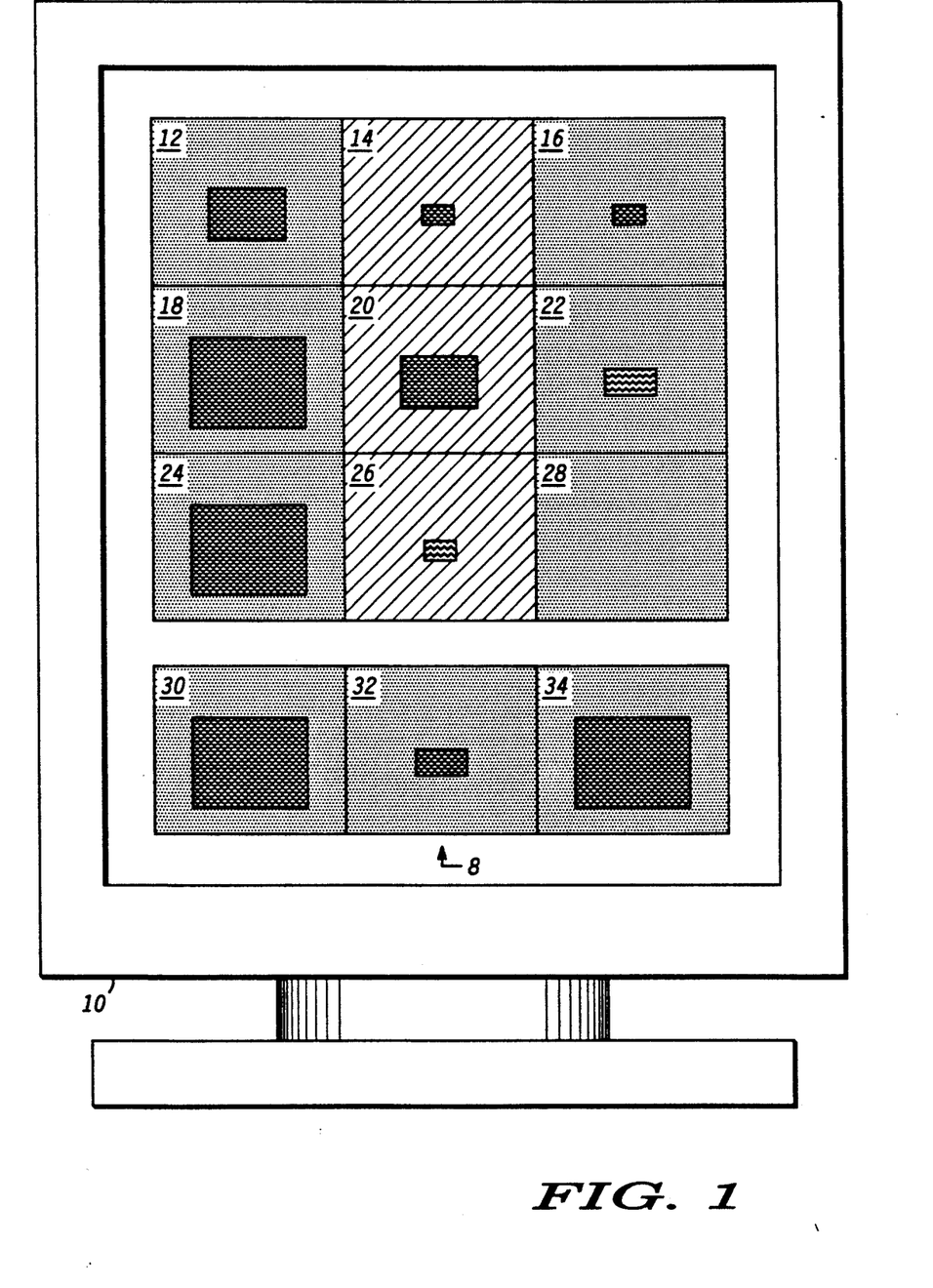
FIG. 1 is an illustration of an artificial neural network represented as groups of neuron blocks each showing output activity on a graphic display terminal.

Referring to FIG. 1, there is shown neural network 8 as it would appear on computer graphic display terminal 10 including a first logical group of neuron blocks 12, 14, 16, 18, 20, 22, 24, 26 and 28 each providing learning and recognition functions. For example, neuron blocks 12-28 may form a well known Kohonen feature map. A second logical group includes neuron blocks 30, 32 and 34 and may represent preprocessing elements for the first group of neuron blocks 12-28 such as a series of time delay elements for providing a temporal signal vector. While only twelve neurons are shown in FIG. 1 to simply the explanation of the invention, it is understood that neural network 8 may comprise hundreds or even thousands of neurons for performing a useful function.

There are potentially $N^2$ synapses for N neurons, thus, display screen 10 may easily become cluttered if the synapses and interconnections of neural netowrk 8 are presented in a conventional manner. One key feature of the present invention is the method of displaying neuron blocks 12-28 and 30-34 in a simplified yet meaningful manner without the synapses, summing junctions and nonlinear sigmoid functions and connection lines typically associated with a neural network. It is understood that neuron blocks 12-28 and 30-34 are each responsive to one or more input signals and provide at least one output signal. Therefore, the inputs and outputs are intentionally omitted but implied to simplify the presentation of neural network 8 on computer graphics display terminal 10. For example, neuron block 12 may comprise a plurality of synapses coupled for receiving signals from say neuron blocks 30, 32 and 34, and further including a summing element and possibly a nonlinear sigmoid for providing an output signal as a representation of the summation of the products of the applied input signal vector and synaptic weights processed therethrough. Neuron blocks 14-34 may also include synapses, summing junction and a nonlinear sigmoid connected through neural network 8 in a similar manner although again not specifically shown.

During the design process, the user typically groups a number of neurons together for performing a particular function. As stated, the first group of neuron blocks 12-28 may form a feature map while the second group of neuron blocks 30-34 are signal delay elements for the feature map. The operation of neural network 8 is not as important in the present invention as the method of displaying its attributes as described herein. In general, the user may define a net list of interconnections between neuron blocks 12-34 and a series of input signal vectors and observe the behavior of neural network 8 as it learns the information content thereof. Furthermore, the user may observe the behavior of particular areas of neural network 8 while evaluating the overall performance. As will be shown, it is not necessary to illustrate each and every synapse and neural connection associated with neural network 8 to observe and understand the system operation. Therefore, present invention simplifies the presentation of neural network 8 while allowing the user to expound upon one or more areas of interest for further detail.

Accordingly, one embodiment may comprise computer simulation software coded to accept commands from the user, say as predetermined keystrokes from the keyboard entry panel (not shown) possibly in combination with a mouse positioning device, and select one or more areas of interest from neural network 8 for obtaining more information regarding its state of learning and operation. For example, say the user is interested in knowing the output activity of neuron blocks 12-34. Upon selecting a first command with the cursor positioned within the first logical group of neurons 12-28, display terminal 10 presents the output activity thereof as shown in FIG. 1, wherein each neuron block 12-28 includes a shaded inner box representing the level of activity. By placing the cursor in the second logical group of neurons and pressing the first command key again, the output activity of neurons 30-34 is displayed in FIG. 1. The absence of an inner box such as neuron block 28 represents zero activity, that is a zero output signal at the summing junction and nonlinear sigmoid in response to the input signal vector, while a large shaded inner box within the neuron block indicates a high output signal and a high level of activity. For example, the output signal activity of neuron block 12 is greater than that of neuron block 14 and yet less than that of neuron block 18. Moreover, the polarity of the output signal of each neuron block may be illustrated with the shading pattern. For example, the "fishscale" shading of the inner boxes of neuron blocks 12, 14, 16, 18, 20, 24, 30, 32 and 34 represent a positive activity whereas the "zigzag" shading of neuron blocks 22 and 26 depict a negative output activity. Thus, from a glance of display terminal 10 one can ascertain the regions of neural network 8 experiencing the greatest level of activity from the input signal vector and the polarity thereof. It is understood that the shading shown in FIG. 1 may also be represented with colors such as an intense yellow or red for a positive output signal, and a softer blue or green for negative activities. Alternately, the color hue could be varied to indicate the level of activity in lieu of the physical size of the color block, e.g. the darker the shade the higher the activity level. Indeed, the human engineering provided with colors and shapes could greatly enhance the impact and readability of display screen 10 and would be preferable.

Display terminal 10 may also illustrate the level of learning achieved by neural network 8 either separate or in combination with the activity level. In FIG. 1, the background of neuron blocks 14, 20 and 26 are "crosshatch" shaded to indicate a high level of learning while the "stiple" shading of neuron blocks 12, 16, 18, 22, 24, 28, 30, 32 and 34 represent a lower level of learning. Thus, neuron blocks 18 and 24 may be aggressively learning since each indicates a high output activity level with a low state of learning, while neuron blocks 14, 20 and 26 have developed at least some useable level of learning. The output activity is simply a response to that state of learning.

Figure 2:
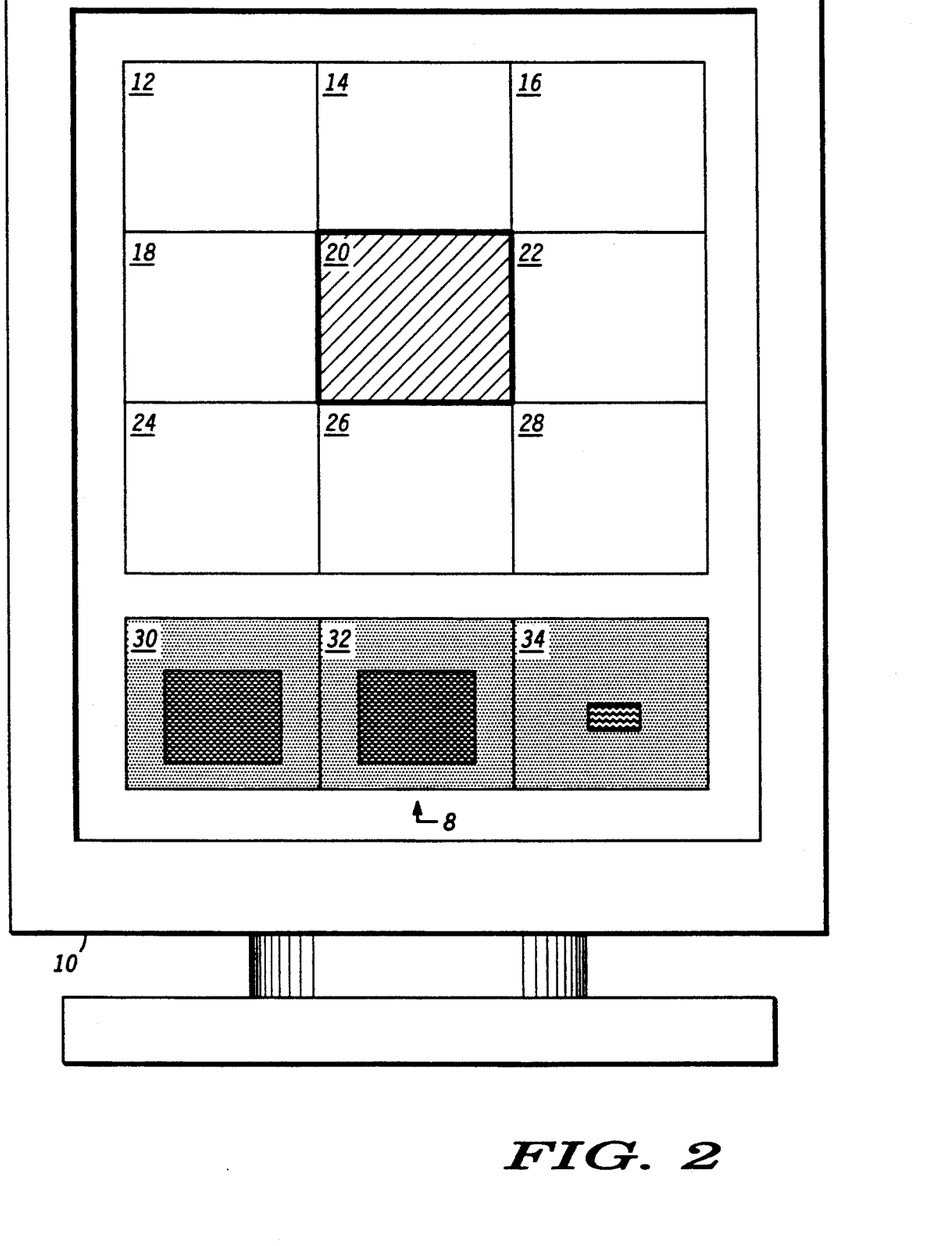
FIG. 2 is an illustration of the artificial neural network displaying the connectivity of one neuron block on the graphic display terminal.

Turning to FIG. 2, another feature of the present invention is illustrated wherein a particular neuron, say neuron block 20, is selected by the mouse device with a point and click action. Upon execution of a second command keystroke, the neuron blocks feeding the input of neuron block 20 are revealed. The neurons not connected to the inputs of neuron block 20, i.e. neuron blocks 12, 14, 16, 18, 20, 22, 24, 26 and 28, remain clear or neutral, while neuron blocks 30, 32 and 34, each having an output signal applied to an input of neuron block 20, are background shaded according to the level of learning. The size and shade of the inner box of neuron blocks 30, 32 and 34 represents the magnitude and polarity of synaptic connection, respectively. That is, the shaded inner boxes of neuron blocks 30, 32 and 34 actually reflect the magnitude and polarity of the synapses associated with neuron block 20. Thus, the output signal of neuron block 30 is received by a moderate positive synapse of neuron block 20, and the output signal of neuron block 32 is applied to a similar positive synapse, while the output signal of neuron block 34 is received by a small negative valued synapse of neuron block 20. Neuron block 20 is typically highlighted or outlined to illustrate that the information on the computer screen applies thereto. With additional color and shading techniques it is possible to select more than one neuron block to illustrate its interconnection and relative weighting within neural network 8. Hence, the simulation software displays one or more neuron blocks of interest upon command with the associated synaptic weighting and interconnections relative to the other neuron blocks. This method of display retains the connectivity relationship unlike some neuron network simulators of the prior art such as disclosed in *NETtalk: A Parallel Network that Learns to Read Aloud*, by Terrence J. Sejnowski, 1986, also commonly referred to as "Hinton" diagrams, which show weights in an arbitrary matrix with no direct connection information.

Figure 3:
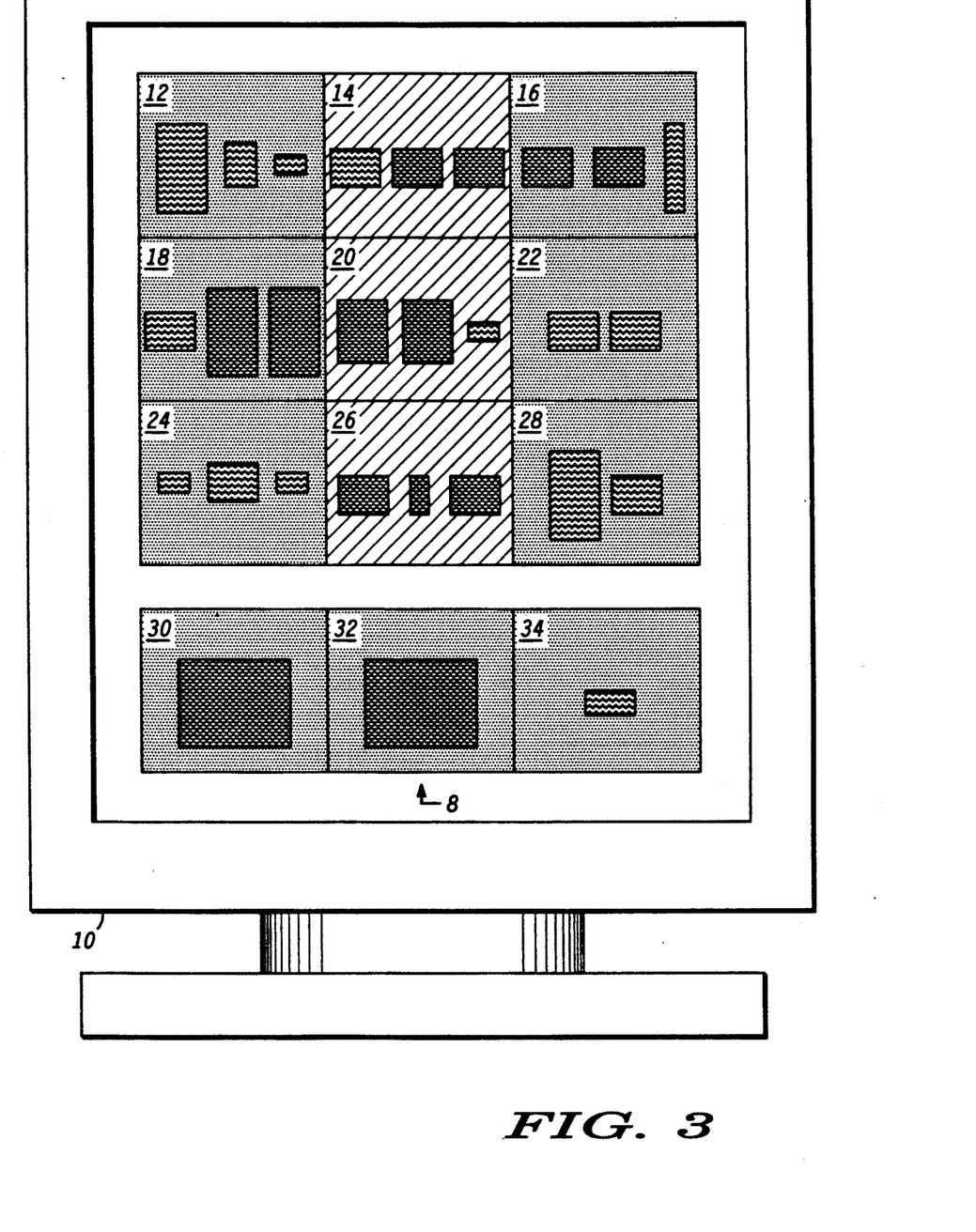
FIG. 3 is an illustration of the artificial neural network showing the synapses associated with each neuron block on the graphic display terminal.

In other cases it would be desirable to see the weights of every neuron block but not necessarily the associated connectivity to the other neuron blocks. Accordingly, upon selecting a third command, an illustration such as shown in FIG. 3 is displayed on computer terminal 10. The magnitude and polarity of each synapse is shown within every neuron block providing the user with a network-wide picture of the synapses albeit without the connectivity information. Again, it would be desirable to show different background shades to indicate states of learning for each neuron block. Neuron blocks 14, 20 and 26 exhibit a relative high state of learning, while neuron blocks 12, 16, 18, 22, 24, 28, 30, 32 and 34 are essentially untrained as shown from the background shading. The display terminal 10 of FIG. 3 discloses three different negative polarity synapses for neuron block 12, and one negative and two positive synapses each of approximately the same magnitude for neuron block 14. Neuron blocks 16-34 include associated synapses as shown. This is in contrast to FIG. 2 wherein the synapses of neuron block 20 are illustrated in the inner boxes of the neurons providing input signals for neuron block 20, i.e. neuron blocks 30-34, in order to establish connectivity therebetween. The two positive and one negative synapses shown in neuron blocks 30-34 of FIG. 2 are moved into neuron block 20 of FIG. 3. Again, the connectivity information between neuron blocks 30-34 and neuron block 20 as provided in FIG. 2 is not carried over into FIG. 3, although the latter provides a tuning curve with more information on the polarity and magnitudes of the synapses for each neuron block at a glance. Neuron blocks 30-34 remain as shown in FIG. 2 since the tuning curve typically applies to one logical group of neurons at a time.

The tuning curve displays the synapses of each neuron within the same neuron block. This allows the user to visualize patterns of cooperation between neighboring neurons. For example, adjacent neuron blocks having synapses of similar magnitude and polarity are responsive to like input signal vectors. This feature is particularly useful in analyzing feature maps.

Figure 4:
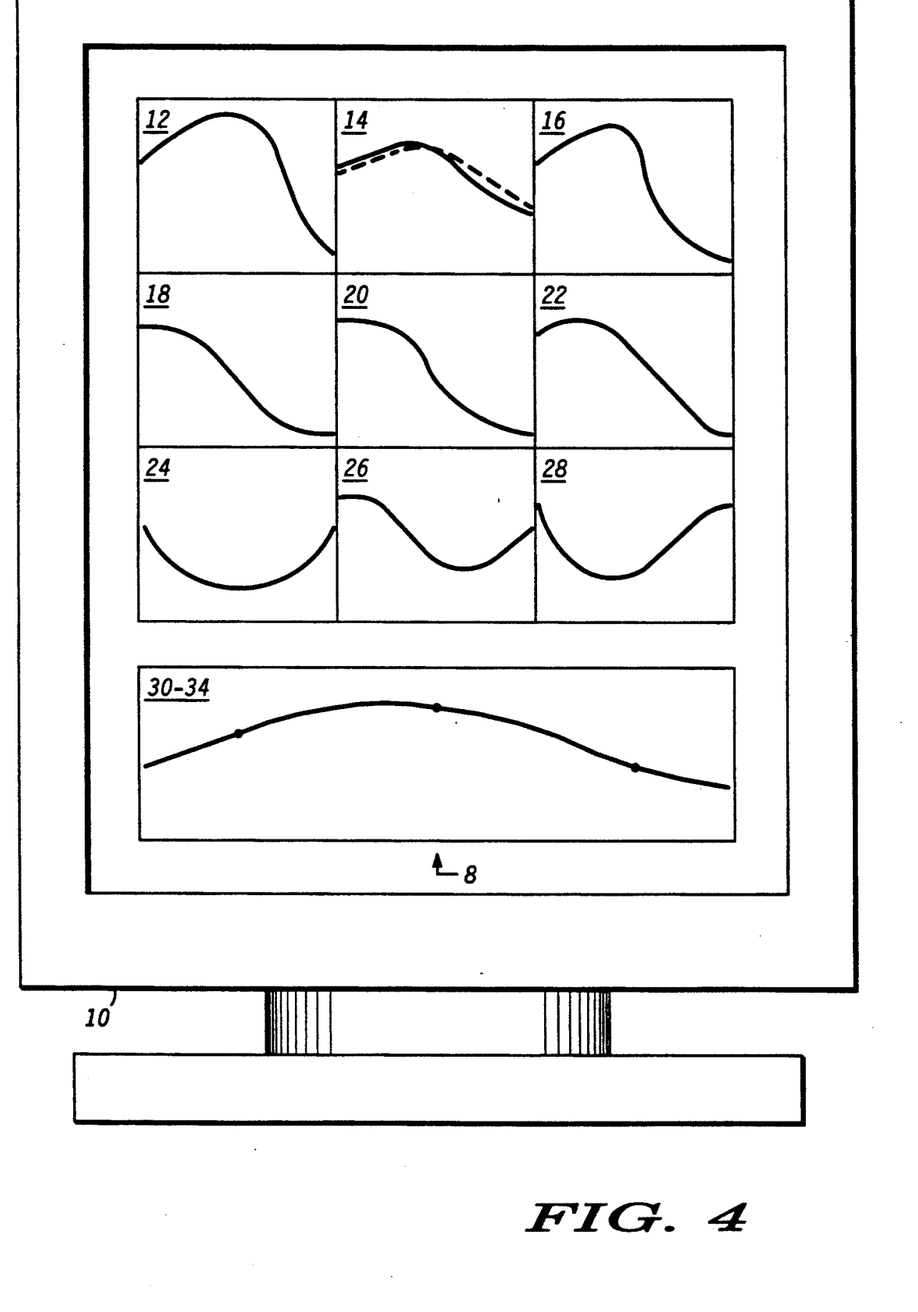
FIG. 4 is an illustration of the artificial neural network displaying a strip chart recording of the activity of the neuron blocks on the graphic display terminal.

Another technique of displaying information is shown in FIG. 4 as a strip chart recording as solid lines useful in temporal relationships, wherein neuron blocks 30-34 are illustrated as a composite waveform with three data points, one each from the output signals of neuron blocks 30, 32 and 34, respectively. Neuron blocks 30-34 may comprise a signal delay line such that the data points shown in FIG. 4 are time related. In practice, many more neuron blocks like 30-34, say twenty or more, would be used to provide a reasonable input signal vector for application to a number of neuron blocks like 12-28. FIG. 4 includes a tuning curve for neuron blocks 12-28. The same waveform shown in composite neuron block 30-34 is superimposed as a dotted line on one or more neuron blocks possibly including the one coming the closest to matching the corresponding temporal response of the output signal of neuron blocks 12-28 (solid line) of FIG. 4. Thus, the user can visually identify the relative match between the input signal vector and the response of neuron blocks 12-28. For example, neuron block 14 comes closes to matching the input signal vector and thus provides the highest positive output activity, while neuron blocks 12, 16-28 are to one degree or another non-responsive to the same input signal vector (low degree of correlation between the solid line and dotted line) thereby generating a zero or negative output signal. Again, colors should greatly enhance the readability of display terminal 10. This provides an improvement over an unrelated matrix display since the user can immediately identify developing patterns since the connectivity is preserved.

Figure 5:
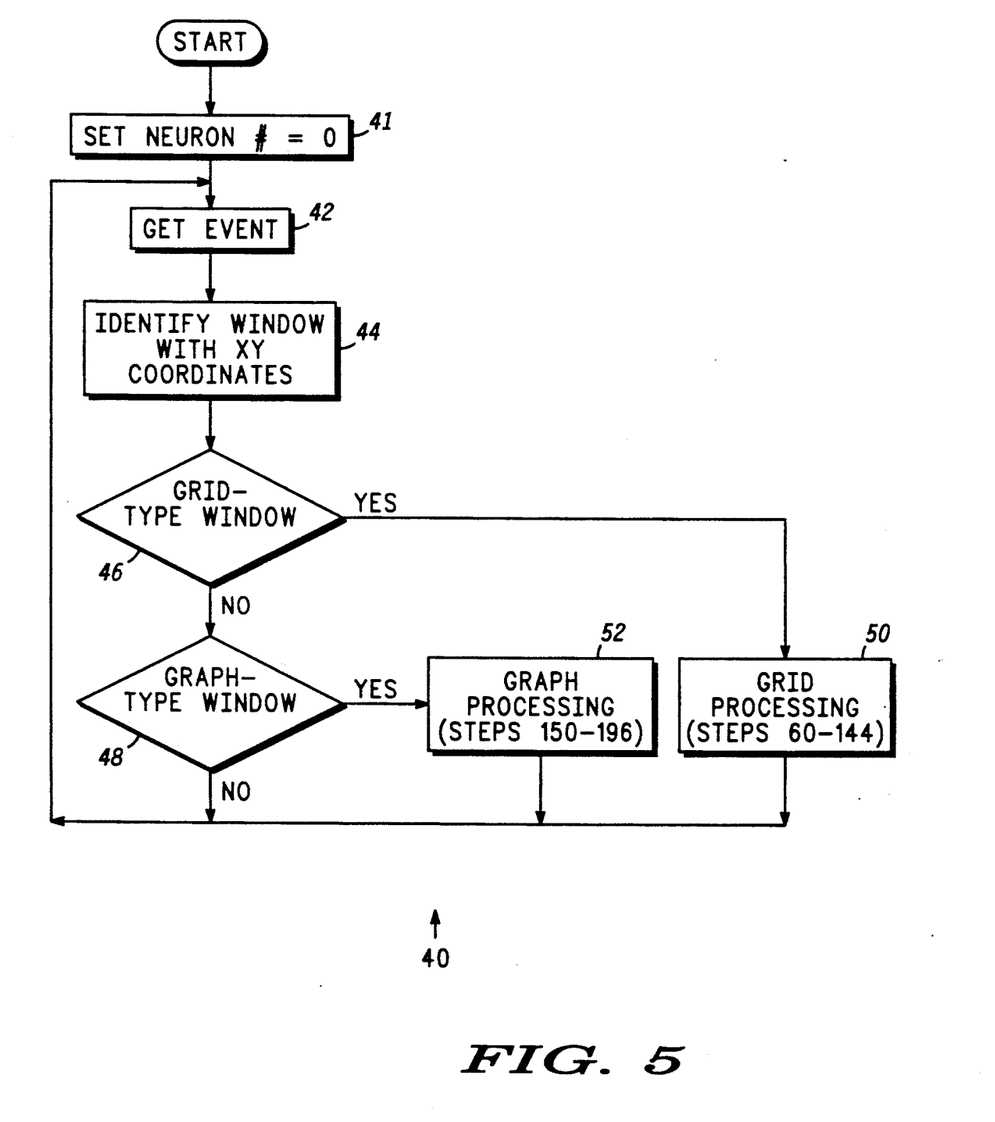
FIGS. 5-10 are flow charts illustrating the preferred method of the present invention.

As stated, one embodiment may comprise computer simulation software represented as flow chart diagram 40 in FIG. 5. SET NEURON #=0 step 41 initializes global variable neuron # for later use. The software program typically spends most of the time in GET EVENT step 42 waiting for an interrupt and command from the user via keyboard or mouse entry. GET EVENT step 42 is completed upon receiving the user interrupt and command by returning the type of event and the XY coordinates of the cursor on display terminal 10 as determined by prior movement of the mouse positioning device or keyboard command. The XY coordinates are passed to IDENTIFY WINDOW step 44 for identifying the selected window or region on display terminal 10. Neuron blocks 12-28 may comprise one window while neurons blocks 30-34 form another window. IDENTIFY WINDOW step 44 also ascertains the type of window such as a grid-type display for neuron blocks 12-34 of FIGS. 1-3, or a graph-type display such as shown in FIG. 4. The program checks the selected window type in GRID-TYPE WINDOW step 46 and GRAPH-TYPE WINDOW step 48 and branches to GRID PROCESSING step 50 or GRAPH PROCESSING step 52, accordingly. Other types of characterizations and representations of neuron blocks 12-34 may be included after GRID-TYPE WINDOW step 46 and GRAPH-TYPE WINDOW step 48 for displaying information in other formats. If no valid window type is selected, flow chart 40 returns to GET EVENT step 42.

Figure 6:
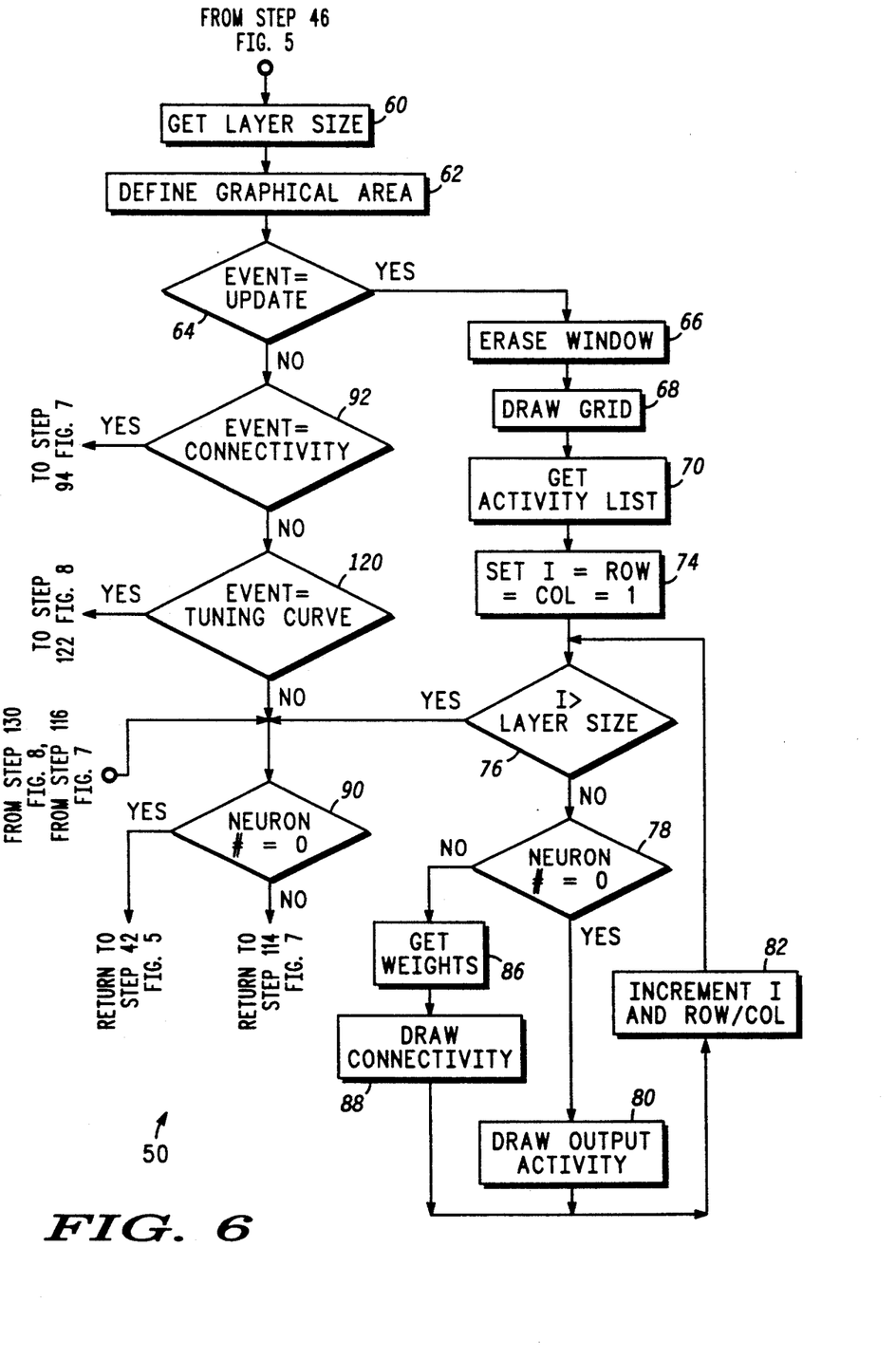

First consider the processing for a grid-type window, such as shown in FIGS. 1-3, as performed in GRID PROCESSING step 50 which is disclosed in greater detail in FIG. 6, wherein GET LAYER SIZE step 60 calculates the size of the selected window (number of neuron blocks contained therein) and returns the identifying number of the neuron block within the selected window having the most output activity. For example, the size of the window comprising neuron blocks 12-28 of FIG. 1 is nine and neuron block 18 indicates the highest level of activity. Next, DEFINE GRAPHICAL AREA step 62 is called for scaling the selected window to limit the area of subsequent graphical operations. That is, the graphics portion of the operating system is oriented to draw neuron blocks 12-28 on display terminal 10. DEFINE GRAPHICAL AREA step 62 also gets the user specified row and column configuration, e.g., three rows and three columns for neuron blocks 12-28 of FIG. 1-3.

Once the graphical area of the display screen is defined, flow chart 40 branches based upon the type of event detected in GET EVENT step 42. If the type of event is a screen update for displaying the neuron output activity such as shown in FIG. 1, EVENT=UPDATE step 64 branches to ERASE WINDOW step 66 for blanking the selected window such that the updated screen information may be cleanly displayed without the clutter from previous screen information. DRAW GRID step 68 then creates the rows and columns defining the border of each of the individual neuron blocks followed by GET ACTIVITY LIST step 70 which returns the present output signal activity of the nine neuron blocks 12-28 within the selected window of the present example. SET I=ROW=COL=1 step 74 initializes counting variables I, row and column to value one. For each of the nine neuron blocks 12-28, steps 76-82 draws the output activity. For example, I>LAYER SIZE step 76 checks for the completion of the loop comprising steps 76-88, wherein the counting variable I increments from a value of one to the layer size (nine) for neuron blocks 12-28. While the counting variable I is less than the layer size, I>LAYER SIZE step 76 branches to NEURON # =0 step 78 for specific display processing. Since the global variable neuron # is presently equal to zero from step 41, DRAW OUTPUT ACTIVITY step 80 draws the shaded inner activity box for the current neuron block according to counting variables I, row and column. INCREMENT I & ROW/COL step 82 increments the counting variables I, row and column as appropriate for the next neuron block. The loop repeats through steps 76-82 for each of neuron blocks 12-28 of the selected window. The neuron block having the greatest output activity is highlighted by outlining in a contrasting color during its pass through DRAW OUTPUT ACTIVITY step 80. When the counting variable I exceeds the layer size, I>LAYER SIZE step 76 branches to NEURON#=0 step 90 which returns to step 42 of FIG. 5 or step 114 of FIG. 7 accordingly. The case where the global variable neuron# is not equal to zero for processing through GET WEIGHTS step 86 and DRAW CONNECTIVITY step 88 is discussed next.

Figure 7:
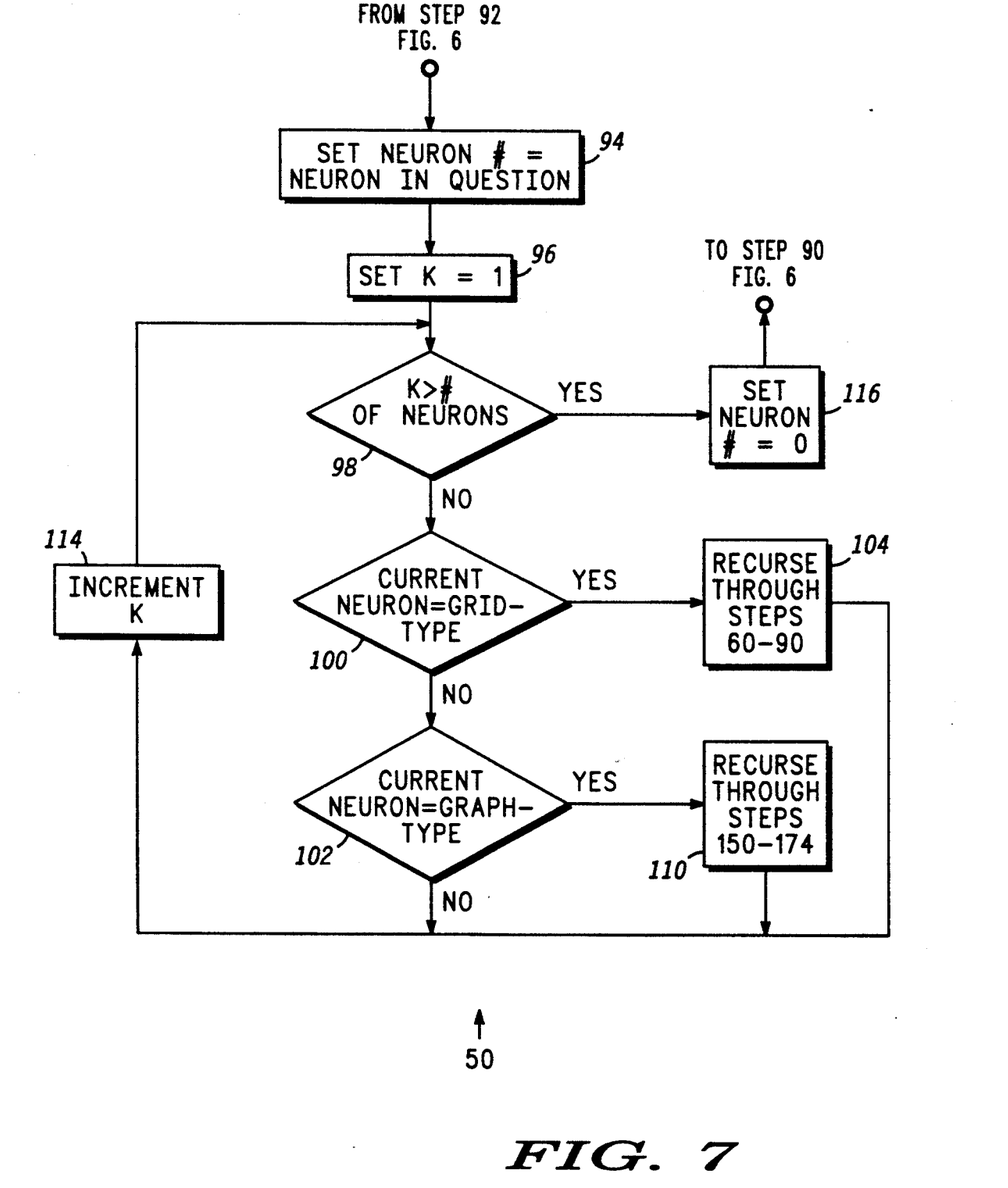

Continuing with FIG. 6, if the type of event is to show connectivity for one neuron block of 12-28 corresponding to the XY coordinates returned from GET EVENT step 42, EVENT=CONNECTIVITY step 92 branches to SET NEURON#=NEURON IN QUESTION step 94 of FIG. 7 which sets the global variable neuron# to the identifying number of the neuron block corresponding to the XY coordinates returned from GET EVENT step 42. For example, the user may position the cursor over neuron block 20 with the mouse device and execute the second command from the keyboard thereby displaying the connectivity for neuron block 20 as shown in FIG. 2. SET K=1 step 96 initializes the counting variable K to value one. For every neuron block on the display screen, steps 98-114 draws the connectivity for neuron block 20. For example, K># OF NEURONS step 98 checks for the completion of the loop comprising steps 98-114, wherein the counting variable K increments from a value of one to the total number of neuron blocks on the display screen. While the counting variable K is less than the number of neuron blocks, K># OF NEURONS step 98 branches to CURRENT NEURON=GRID-TYPE step 100 or CURRENT NEURON=GRAPH-TYPE step 102 depending upon the type of window since each neuron block may be pre-selected to display in grid format (FIG. 1-3) or graph format (FIG. 4). The relative connectivity to neuron block 20 is thus displayed according to the pre-select display mode. If the current neuron block within the loop is a grid-type, then CURRENT NEURON=GRID-TYPE step 100 branches to RECURSE THROUGH STEPS 60-90 step 104 with type of event equal to update. The recursive operation is well understood in the art of computer programming as a method of re-executing a subroutine of program code from within the same subroutine. GET LAYER SIZE step 60 through I>LAYER SIZE step 76 have already been described. With the global variable neuron# equal to the neuron in question (neuron block 20), NEURON#=0 step 78 is false and branches to GET WEIGHTS step 86 wherein the synaptic weight between the neuron in question and the current neuron block processing through RECURSE THROUGH STEPS 60-90 step 104 is identified. If such a weighting element exists, DRAW CONNECTIVITY step 88 displays the connection therebetween by placing an appropriate shaded inner box in the current neuron block, see FIG. 2. This shaded inner box now represents the weight of the synapse, and its position in the grid represents the connectivity information. Furthermore, if the current neuron processing through step 104 is the neuron in question, DRAW CONNECTIVITY step 88 highlights the same.

Alternately, if the current neuron block within the loop of FIG. 7 is a graph-type, then NEURON=GRAPH-TYPE step 102 branches to RECURSE THROUGH STEPS 150-174 step 110 with the type of event equal to update. The explanation of steps 150-174 is forthcoming. The counting variable K is incremented in INCREMENT K step 114 for processing the next neuron block. When all neuron blocks on the display screen have been updated to show connectivity to neuron block 20, the global variable neuron# is returned to a zero value in SET NEURON#=0 step 116 followed by a return to step 90 of FIG. 6.

Figure 8:
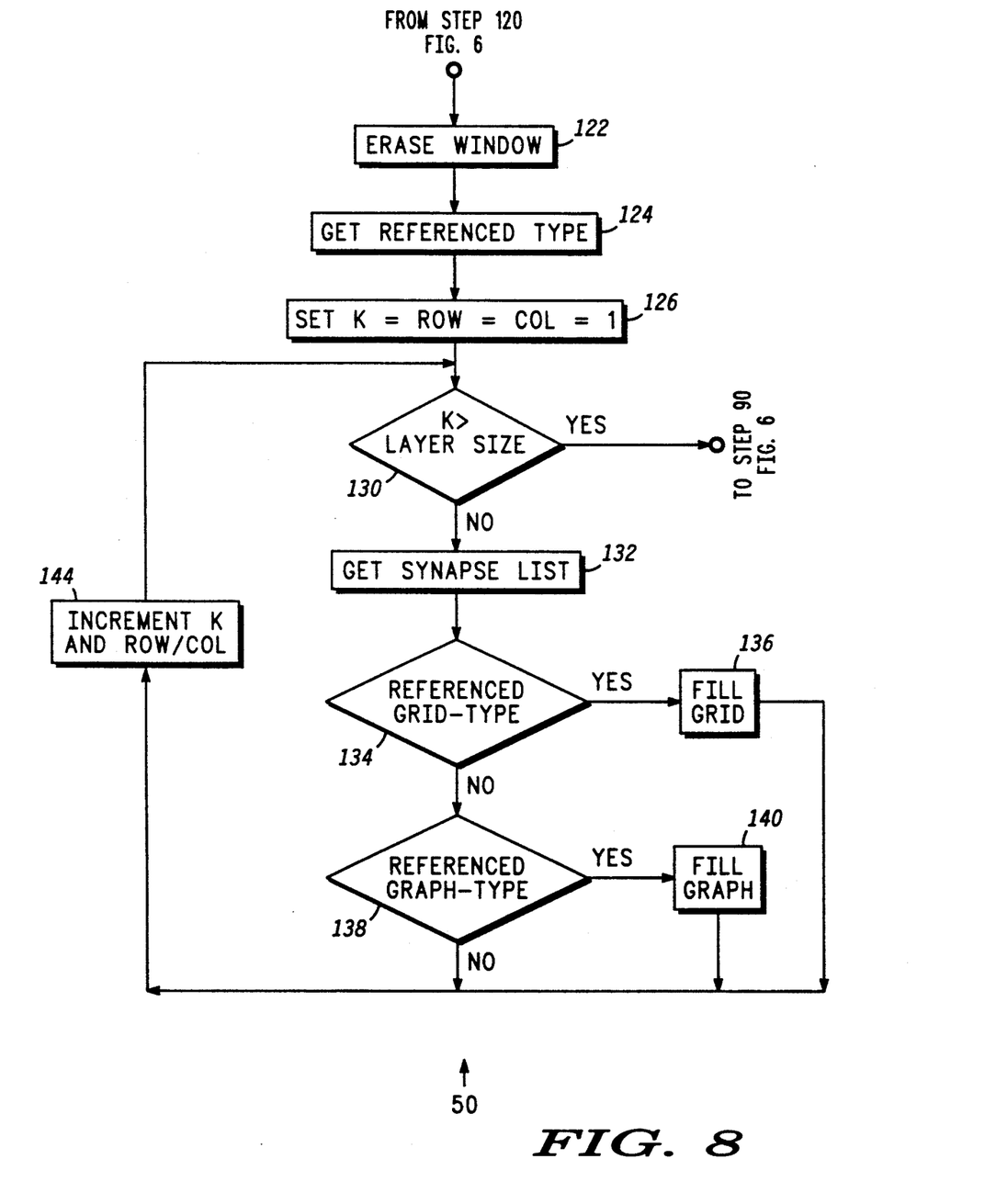

Again referring to FIG. 6, if the type of event is to show a tuning curve for neuron blocks 12-28, EVENT=TUNING CURVE step 120 branches to ERASE WINDOW step 122 of FIG. 8 for blanking the selected window. GET REFERENCED TYPE step 124 returns the type (grid or graph) of the window to which the first neuron block of the subject window is connected. The first neuron block is determined by the initial value of the counting variable K. SET K=ROW=COL=1 step 126 initializes counting variables K, row and column to value one. For each of neuron blocks 12-28, steps 130-144 draw the synapses associated with each neuron block within the same as shown in FIG. 3. More specifically, K>LAYER SIZE step 130 checks for the completion of the loop comprising steps 130-144, wherein the counting variable K increments from a value of one to the layer size (nine) for neuron blocks 12-28. While the counting variable K is less than the layer size, K>LAYER SIZE step 130 branches to GET SYNAPSE LIST step 132 for returning the values of the synapses of the current neuron block identified by the counting variable K. If the referenced type is a grid-type, REFERENCED GRID-TYPE step 134 branches to FILL GRID step 136 for placing shaded inner boxes representing the synapses thereof within the current neuron block. Alternately, if the referenced type is a graph-type, REFERENCED GRAPH-TYPE step 138 branches to FILL GRAPH step 140 which draws lines representing the synapses within the current neuron block. INCREMENT K & ROW/COL step 144 increments the counting variables K, row and column as appropriate for the next neuron block. The loop repeats through steps 130–144 for each of neuron blocks 12–28 of the selected window. When the counting variable K exceeds the layer size K>LAYER SIZE step 130 branches to NEURON#=0 step 90 which in turn returns to step 42 of FIG. 5.

Figure 9:
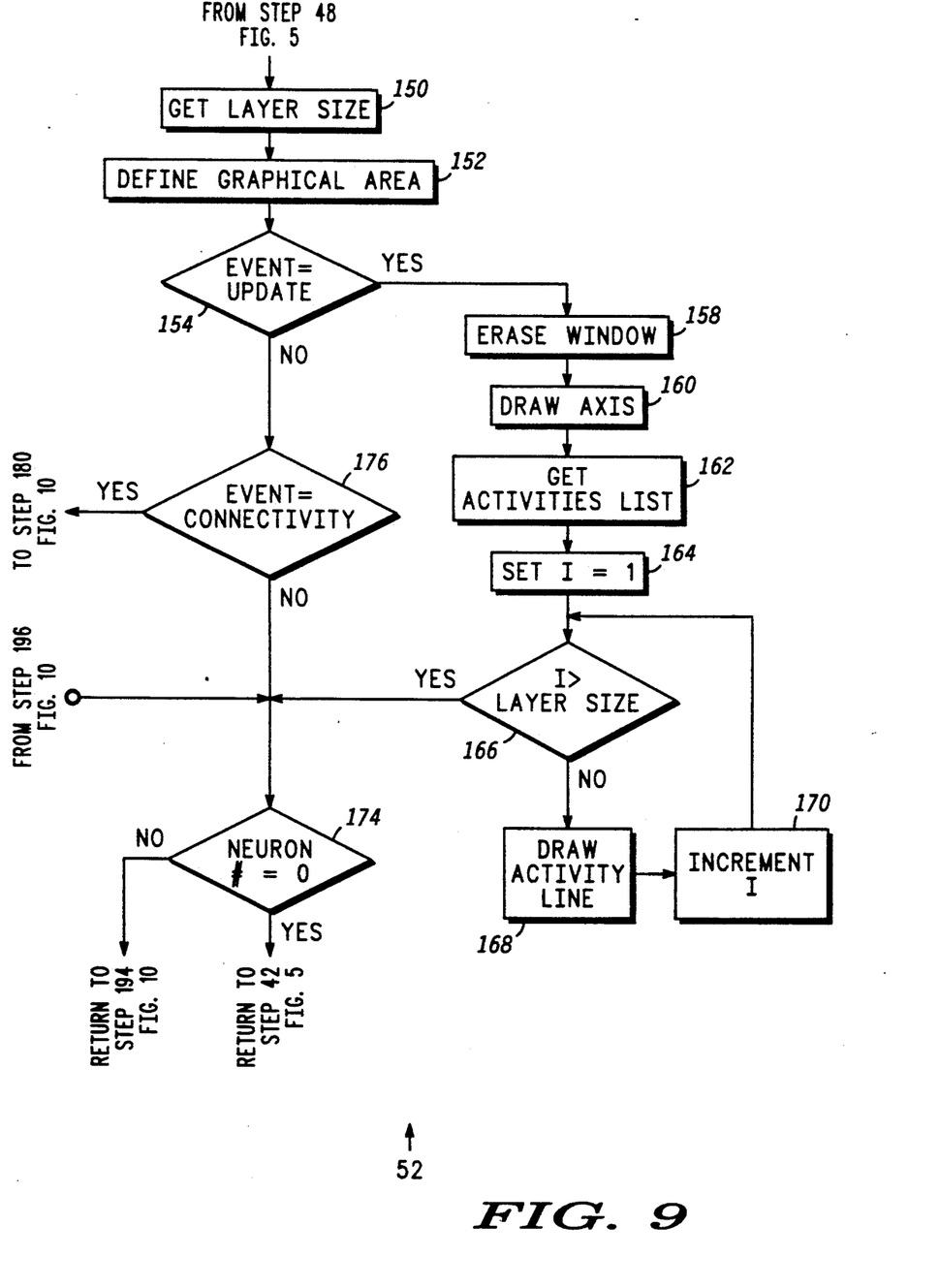

Returning to FIG. 5 now consider the processing for a graph-type window, such as shown in FIG. 4, as performed in GRAPH PROCESSING step 52 which is disclosed in greater detail in FIG. 9, wherein GET LAYER SIZE step 150 calculates the size of the selected window and returns the identifying number of the neuron block within the selected window having the most output activity. Assume for this case the cursor is in neuron block 30. DEFINE GRAPHICAL AREA step 152 is called for scaling the selected window to limit the area of subsequent graphical operations and get user specified graph configuration, e.g., three data points scaled by one for neuron blocks 30–34 of FIG. 4.

Once the graphical area of the display screen is defined, flow chart 40 branches based upon the type of event detected in GET EVENT step 42. If the type of event is a screen update for displaying the neuron output activity such as shown for neuron blocks 30–34 of FIG. 4, EVENT=UPDATE step 154 branches to ERASE WINDOW step 158 for blanking the selected window. DRAW AXIS step 160 then creates the axis for each of the individual neuron blocks followed by GET ACTIVITY LIST step 162 which returns the present output signal activity of the three neuron blocks 30–34 within the selected window. SET I=1 step 164 initializes counting variable I to a value of one. For each of the three neuron blocks 30–34, steps 76–88 draws the output activity as a line graph. For example, I>LAYER SIZE step 76 checks for the completion of the loop comprising steps 166–170, wherein the counting variable I increments from a value of one to the layer size (three) for neuron blocks 30–34. While the counting variable I is less than the layer size, I>LAYER SIZE step 166 branches DRAW ACTIVITY LINE step 168 for drawing the output activity line of the current neuron block according to counting variable I. INCREMENT I step 170 increments the counting variable I for the next neuron block. The loop repeats through steps 166–170 for each of neuron blocks 30–34. The neuron block having the greatest output activity is highlighted during its pass through DRAW ACTIVITY LINE step 168. When the counting variable I exceeds the layer size I>LAYER SIZE step 166 branches to NEURON#=0 step 174 which returns to step 42 of FIG. 5 or step 194 of FIG. 10 accordingly.

Figure 10:
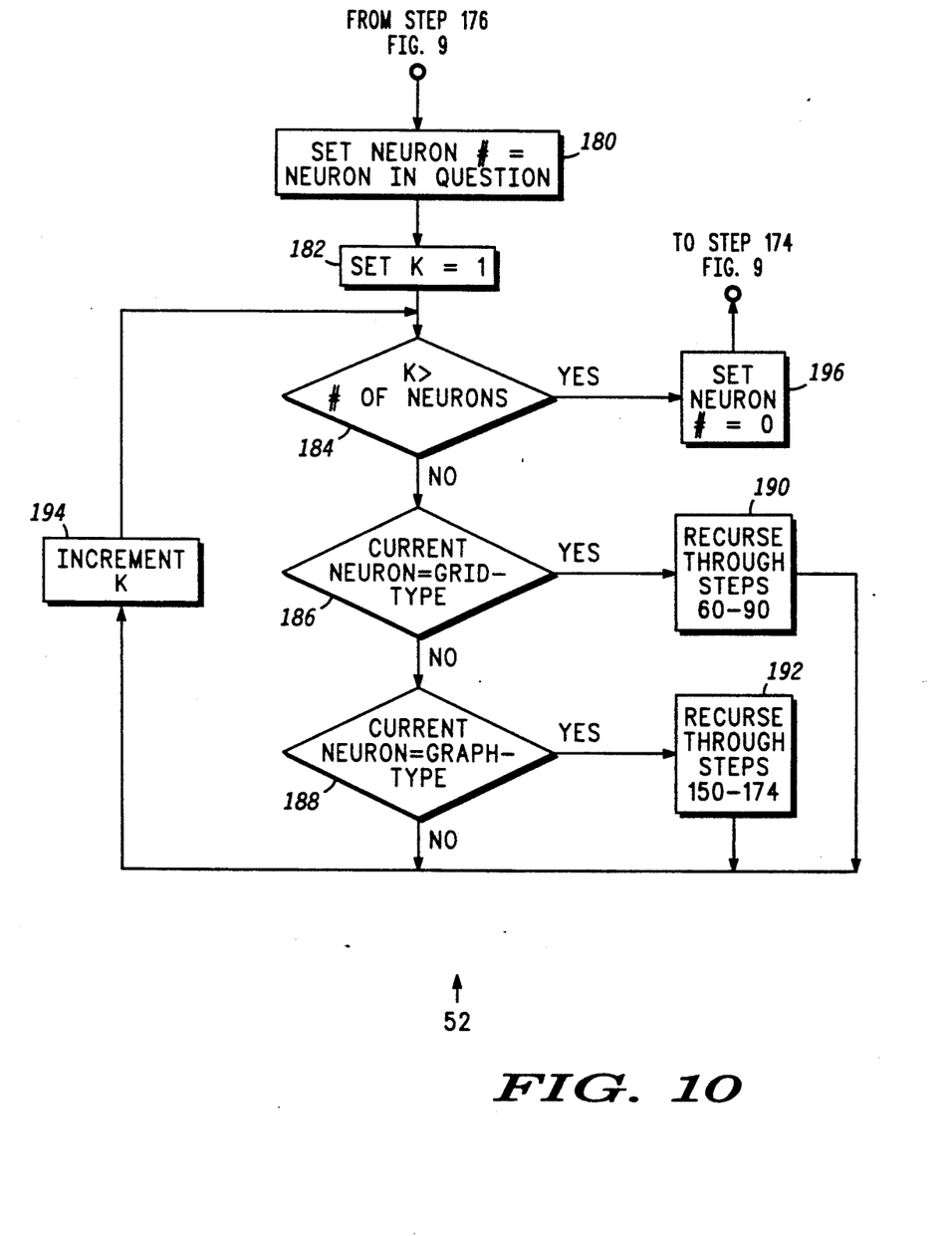

Continuing with FIG. 9, if in this case the user placed the cursor in neuron block 20 and the type of event is to show connectivity for neuron block of 20 corresponding to the XY coordinates returned from GET EVENT step 42, EVENT=CONNECTIVITY step 176 branches to SET NEURON#=NEURON IN QUESTION step 180 of FIG. 10 which sets the global variable neuron# to the identifying number of the neuron block corresponding to the XY coordinates returned from GET EVENT step 42. SET K=1 step 182 initializes the counting variable K to value one. For every neuron block on the display screen, steps 184–194 draws the connectivity for neuron block 20. For example, K># OF NEURONS step 184 checks for the completion of the loop comprising steps 184–194, wherein the counting variable K increments from a value of one to the total number of neuron blocks on the display screen. While the counting variable K is less than the number of neuron blocks, K># OF NEURONS step 184 branches to CURRENT NEURON=GRID-TYPE step 186 or CURRENT NEURON=GRAPH-TYPE step 188 depending upon the type of window, i.e., grid format of FIG. 1–3 or graph format of FIG. 4. The relative connectivity to neuron block 20 is thus displayed according to the pre-select display mode. If the current neuron block with the loop is a grid-type, then CURRENT NEURON=GRID-TYPE step 186 branches to RECURSE THROUGH STEPS 60–90 step 190 with the type of event equal to update. Alternately, if the current neuron block with the loop of FIG. 7 is a graph-type, then CURRENT NEURON=GRAPH-TYPE step 188 branches to RECURSE THROUGH STEPS 150–174 step 192 with the type of event equal to update. The counting variable K is incremented in INCREMENT K step 194 for processing the next neuron block. When all neuron blocks on the display screen have been updated to show connectivity to neuron block 20, the global variable neuron# is returned to a zero value in SET NEURON#=0 step 196 followed by a return to step 174 of FIG. 9.

Hence, what has been provided is a novel computer simulator for displaying the state of an artificial neural network in a simplified yet meaningful manner on a computer display terminal, wherein the user may enter commands to select one or more areas of interest within the neural network for further information regarding its state of learning and operation. One display mode illustrates the output activity of each neuron as representatively sized and shaded boxes within the border of the neuron, while another display mode shows the connectivity as weighted synapses between a user-selected neuron and the remaining neurons of the network in a similar manner. Likewise, it is possible to view the weight and polarity of the synapses of each neuron although without the connectivity information, but with the relationship to its neighbors preserved.

I claim:

1. A method of displaying a state of a neuron network on a graphic display terminal with a plurality of neuron blocks, comprising the steps of:

positioning a cursor on the graphic display terminal with a user interface device;

receiving a command from said user interface device for determining XY-coordinates of said cursor on the graphic display terminal where said XY-coordinates of said cursor identifies a first one of the plurality of neuron blocks;

processing through second ones of the plurality of neuron blocks to identify a synaptic weight connection between said first one of the plurality of neuron blocks and a second one of the plurality of neuron blocks; and displaying a box within said second one of the plurality of neuron blocks upon finding said synaptic weight connection between said first one of the plurality of neuron blocks and said second one of the plurality of neuron blocks where said box has an area representative of said synaptic weight connection.

2. The method of claim 1 further comprising the steps of:

retrieving output activity of the plurality of neuron blocks; and drawing a second box within each of the plurality of neuron blocks representative of said output activity.

* * * * *